United States Patent Office 3,277,050
Patented Oct. 4, 1966

3,277,050
PROCESS FOR CURING POLYEPOXIDES AND RESULTING PRODUCTS
Jimmy Don Pettigrew, Concord, Calif., assignor to Shell Oil Company, New York, N.Y., a corporation of Delaware
No Drawing. Filed July 17, 1961, Ser. No. 124,324
4 Claims. (Cl. 260—47)

This invention relates to a process for curing polyepoxide. More particularly, the invention relates to a new process for curing polyepoxides, and particularly epoxy resins, with a special class of substituted sulfonic acid amides and to the resulting products.

Specifically, the invention provides a new process for curing and resinifying polyepoxides, and preferably epoxy resins such as the glycidyl polyethers of polyhydric phenols, which comprises mixing and reacting the polyepoxide with an amino-substituted aromatic sulfonic acid amide, and preferably sulfanilamide. The invention further provides new and valuable compositions prepared by the above-described process.

As a special embodiment, the invention provides a new process for making an adhesive composition which is particularly adapted for bonding aluminum-to-aluminum which comprises mixing a polyepoxide, and preferably glycidyl polyether of a polyhydric phenol, with an amino-substituted aromatic sulfonic acid amide, and an accelerator for the said sulfonic acid amide, and preferably dicyandiamide.

Epoxy resins and particularly those obtained by reacting epichlorohydrin with polyhydric phenols, are promising materials for use in making adhesives for metals, such as aluminum. These adhesives, however, are not particularly suited for use in the bonding of certain aluminum parts in the automobile or aircraft industry because of their tendency to lose strength when exposed to boiling water or engine coolants, such as aqueous ethylene glycol solutions.

It is an object of the invention therefore to provide a new method for curing polyepoxides. It is a further object to provide a method for curing polyepoxides using a new class of curing agents. It is a further object to provide a new process for curing polyepoxides that give products having improved resistance to boiling water and engine coolants. It is a further object to provide a new epoxy resin adhesive composition particularly suited for bonding aluminum-to-aluminum. It is a further object to provide an adhesive composition for bonding metal-to-metal which has improved resistance to loss of strength when exposed to boiling water, glycols and the like. It is a further object to provide a new class of curing agents for polyepoxides which are particularly useful for preparing adhesives, surface coatings, laminates and the like. Other objects and advantages of the invention will be apparent from the following detailed description thereof.

It has now been discovered that these and other objects may be accomplished by the process of the invention which comprises mixing and reacting the polyepoxide with an amino-substituted aromatic sulfonic acid amide, and optionally an accelerator for the said substituted sulfonic acid amide which is preferably dicyandiamide. It has been surpisingly found that this special process yields products which have properties which are superior to products prepared with conventional type curing agents. It has been found, for example, that the resulting products have unexpectedly high resistance to loss of strength when exposed to boiling water and engine coolants, such as aqueous solutions of alcohols and glycols. In addition, the mixture used in the process has unusually good adhesive properties, particularly for metals such as aluminum. The products are thus ideally suited for use in the preparation of adhesives for bonding aluminum-to-aluminum such as presently needed in the automobile and aircraft industry. It has been found, for example, that an adhesive prepared from a glycidyl ether of a polyhydric phenol and sulfanilamide gives aluminum-to-aluminum bonding strengths which remain at a high level even after many months of exposure to boiling water and antifreeze material such as the alcohols and glycols. Conventional epoxy adhesives used under similar conditions suffer considerable deterioration in strength after such exposure.

The materials used with the polyepoxides according to the process of the invention comprise the amino-substituted aromatic sulfonic acid amides. The aromatic sulfonic acid amides may be mononuclear or polynuclear and may be substituted with one or more sulfonic acid amide groups. The amine groups are preferably attached to alkyl groups or directly to the aromatic ring. Preferred members of this group include those of the formulae

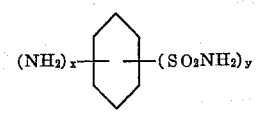

and

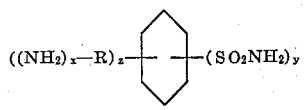

wherein $x$ and $y$ are integers, and preferably 1 to 3, R is an alkyl group containing from 1 to 4, and $z$ is 1 to 4.

Examples of the above compounds include, among others, 3-aminobenzenesulfonamide, 4-amino-benzenesulfonamide, 2 - amino - 3 - methyl - 4 - benzenesulfonamide, 4 - aminomethylbenzenesulfonamide, 2,4 - diaminobenzenesulfonamide, 3 - hydroxy - 5 - aminobenzenesulfonamide, 3,5 - diaminonaphthalenesulfonamide, 3,5 te- (aminomethyl)naphthadenesulfonamide, 3 - nonyl - 5- aminonaphthalenesulfonamide, 3 - chloro - 5 - aminonaphthalene-sulfonamide and the like. Especially preferred are the mononuclear sulfonic acid amides containing up to 25 carbon atoms.

Sulfanilamide

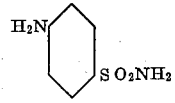

comes under special consideration, particularly because of the superior properties possessed by the resulting cured products.

The polyepoxides to be used in preparing the compositions of the invention comprise those materials possessing more than one vicinal epoxy group, i.e., more than one

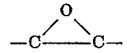

group. These compounds may be saturated or unsaturated, aliphatic, cycloaliphatic, aromatic or heterocyclic and may be substituted with substituents, such as chlorine, hydroxyl groups, ether radicals and the like. They may be monomeric or polymeric.

For clarity, many of the polyepoxides and particularly those of the polymeric type are described in terms of epoxy equivalent values. The meaning of this expression is described in U.S. Patent 2,633,458. The polyepoxides used in the present process are those having epoxy equivalency greater than 1.0.

Various examples of polyepoxides that may be used in the process of the invention are given in U.S. Patent 2,633,458 and it is to be understood that so much of the disclosure of that patent relative to examples of polyepoxides is incorporated by reference into this specification.

Other examples include the epoxidized esters of the polyethylenically unsaturated monocarboxylic acids, such as epoxidized linseed, soybean, perilla, oiticica, tung, walnut and dehydrated castor oil, methyl linoleate, butyl linoleate, ethyl 9,12-octadecadienoate, butyl 9,12,15-octadecatrienoate, butyl eleostearate, monoglycerides of tung oil fatty acids, monoglycerides of soybean oil, sunflower, rapeseed, hempseed, sardine, cottonseed oil, and the like.

Another group of epoxy-containing materials used in the process of the invention include the epoxidized esters of unsaturated monohydric alcohols and polycarboxylic acids, such as, for example, di(2,3-epoxybutyl)adipate, di(2,3-epoxybutyl)oxalate, di(2,3-epoxyhexyl)succinate, di(3,4-epoxybutyl)phthalate, di(2,3-epoxyoctyl)pimelate, di(2,3 - epoxybutyl)tetrahydrophthalate, di(3,4 - epoxybutyl)maleate, di(3,4-epoxycyclohexyl)terephthalate, di-(2,3 - epoxypentyl)thiodipropionate, di(5,6 - epoxytetradecyl)diphenyldicarboxylate, di(3,4 - epoxyheptyl)sulfonyldibutyrate, tri(2,3-epoxybutyl) 1,2,4-butanetricarboxylate, di(5,6-epoxypentadecyl)tartarate, di(2,3-epoxybutyl)-azelate, di(4,5-epoxyoctadecyl)malonate.

Another group of the epoxy-containing materials includes those epoxidized esters of unsaturated alcohols and unsaturated carboxylic acids, such as 2,3-epoxybutyl 3,4 - epoxypentanoate, 2,3-epoxypropyl epoxycyclohexanecarboxylate, 2,3-epoxybutyl epoxycyclopentanoate, 3,4-epoxyhexyl 3,4 - epoxyhexyl 3,4 - epoxypentanoate, 3,4-epoxycyclohexyl 3,4 - epoxycyclohexanoate, 3,4 - epoxycyclohexyl 4,5 - epoxyoctanoate, 2,3 - epoxycyclohexylmethyl epoxycyclohexane carboxylate.

Still another group of the epoxy-containing materials included epoxidized derivatives of polyethylenically unsaturated polycarboxylic acids such as, for example, dimethyl 8,9,12,13-diepoxyeicosanedioate, dibutyl 7,8,11,12-diepoxyoctadecanedioate, dioctyl 10,11-diethyl-8,9,12,13-diepoxy-eicosanedioate, dihexyl 6,7,10,11 - diepoxyhexadecanedioate, didecyl 9-epoxy-ethyl-10,11-epoxyoctadecanedioate, dibutyl 3-butyl-3,4,5,6-diepoxycyclohexane-1,2-dicarboxylate, dicyclohexyl 3,4,5,6-diepoxycyclohexane-1,2-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexene-1,4-dicarboxylic acid and the like, and mixtures thereof.

Still another group comprises the epoxidized polyethylenically unsaturated hydrocarbons, such as epoxidized 2,2-bis(2-cyclohexenyl)propane, epoxidized vinyl cyclohexene and epoxidized dimer of cyclopentadiene.

Another group comprises the epoxidized polymers and copolymers of diolefins, such as butadiene. Examples of this include, among others, butadiene-acrylonitrile copolymers (Hycar rubbers), butadiene-styrene copolymers and the like.

Another group comprises the glycidyl-containing nitrogen compounds, such as diglycidyl aniline and di- and triglycidylamine, as well as glycidyl ethers of N,N-diglycidyl 4-hydroxyaniline.

The polyepoxides that are particularly preferred for use in the compositions of the invention are the glycidyl ethers and particularly the glycidyl ethers of polyhydric phenols and polyhydric alcohols. The glycidyl ethers of polyhydric phenols are obtained by reacting epichlorohydrin with the desired polyhydric phenols in the presence of alkali. Polyether A and polyether B described in the above-noted U.S. 2,633,458 are good examples of polyepoxides of this type. Other examples include the polyglycidyl ether of 1,1,2,2-tetrakis(4-hydroxyphenyl)ethane (epoxy value of 0.45 eq./100 g. and melting point 85° C.), polyglycidyl ether of 1,1,5,5-tetrakis(hydroxyphenyl)pentane (epoxy value of 0.514 eq./100 g.) and the like and mixtures thereof.

The amino-substituted aromatic sulfonic acid amides and the above-noted polyepoxides may be combined in a variety of different ratios. To obtain the best results, the substituted sulfonic acid amide is preferably used in at least a chemical equivalent amount, i.e., in an amount sufficient to furnish one amino-substituted hydrogen atom for every epoxy group in the polyepoxide. Still more preferably the substituted sulfonic acid amide and the polyepoxide are combined in chemically equivalent ratios varying from about .5:1 to 1.5:1, and generally between .8:1 and 1:1.

It is preferred to employ an accelerator along with the amino-substituted aromatic sulfonic acid amide. Examples of these include, among others, amines, amides and the like, such as, for example, benzyldimethylamine, dicyandiamide, tri(dimethylaminomethyl)phenol, p,p'-bis-(dimethylaminophenyl)methane, pyridine, dimethyl aniline, benzyldiethylamine, methyldiethanolamine, dimethylaminopropylamine, morpholine, stearyldimethylamine, tri-n-butylamine, N,N-dibutyl butyl amine, tri-n-hexylamine, ethyl di-n-propylamine, phenylene diamine, diethylene triamine and the like, and mixtures thereof. Other accelerators include the salts of various inorganic acids and organic acids and amines, such as, for example, the hydrochloride, sulfate and acetate of each of the above-described tertiary amines. Others include the quaternary ammonium salts, such as benzyltrimethylammonium chloride, phenyl-tributylammonium chloride, benzyltrimethylammonium borate, diphenyldioctylammonium chloride and the like, and mixtures thereof.

Preferred accelerators to be employed include dicyandiamide tri(dialkylaminoalkyl)phenols, aromatic tertiary amines, and aliphatic tertiary amines, such as trialkyl amines, tricycloalkylamines, alkyl dicycloalkyl amines, diaminoalkanes, dialkylene triamines, phenylene diamines and the like. Preferred salts include the hydrochloride, sulfate and acetate of the above-described amines. Preferred quaternary salts are those of the the formula

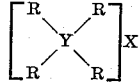

wherein Y is nitrogen, R is an alkyl, aryl or arylalkyl radical, preferably containing no more than 12 carbon atoms and X is chlorine, bromine or iodine.

The above-noted accelerators can be employed in various amounts. Preferred amounts range from about .5 part to 15 parts per 100 parts of the polyepoxide. Still more preferred are the ranges of .8 part to 12 parts per 100 parts of polyepoxide.

Other materials may also be included with the above-described components depending upon the intended use of the composition. For example, if the composition is to be used as an adhesive, it may be desirable to include additives, such as fillers as asbestos, aluminum oxide, iron oxide, sand, and the like, pigments, dyes, other resins, various thermoplastic and thermosetting resins as various nylons (polyamides), polycarbonates, formaldehyde polymers, urea-formaldehyde resins, phenol-formaldehyde resins, polyacetal resins, polyvinyl resins, rubbers, and the like, and mixtures thereof.

It may also be desired, particularly if the composition is to be used for making surface coating composition to add various active or inert diluents or solvents. Examples of such materials include, among others, ketones like acetone, methyl ethyl ketone, methyl isobutyl ketone, isophorone, etc. esters such as ethyl acetate, butyl acetate, Cellosolve acetate (ethylene glycol monoacetate), methyl Cellosolve acetate (acetate of ethylene glycol monomethyl ether), etc.; ether alcohols, such as methyl, ethyl or butyl ether of ethylene glycol or diethylene glycol; chlorinated hydrocarbons such as trichloropropane, chloroform, etc. Solvents which remain in the cured composition may also be used, such as diethyl phthalate, liquid esters of succinic acid, adipic acid and the like. Reactive diluents which enter into the reaction may also be utilized. Examples of these include, among others, glycidyl allyl ether, glycidyl phenyl ether, butyl glycidyl ether, styrene oxide, 1,2-hexylene oxide, epoxidized dicyclopentenyl ether, epoxidized dicyclohexenyl ether and the like, as well as cyano-substituted hydrocarbons, such as acetonitrile, propionitrile, benzonitrile, and the like. It is also convenient to employ the solid of semi-solid polyepoxides in combination with a liquid polyepoxide, such as a normally liquid glycidyl polyether of a polyhydric alcohol.

The compositions prepared as above may be cured over a wide range of temperatures. The compositions, for example, may be cured by allowing to stand at room temperature. In this case, it is preferred to employ one or more of the above-described accelerators with the amino-substituted aromatic sulfonic acid amide. Faster cures are, however, obtained at elevated temperatures and it is generally preferred to heat the compositions to effect cure. Preferred temperatures range from about 50° C. to 250° C.

As noted above, the compositions of the invention are particularly useful and valuable as adhesives. They may be used in the bonding of a variety of different materials, such as, for example, metal-to-metal, wood-to-wood, glass-to-glass, glass-to-metal and the like. They are of particular value, especially because of the aforementioned retention of strength when in contact with boiling water and engine coolants to be used as adhesives for aluminum-to-aluminum bonding for the auto- and aircraft industries. When applied as an adhesive, the compositions may simply be spread out on the desired surface to form a film of various thicknesses, e.g., 5 to 30 mils, and then the other surface to be bonded is superimposed. The combination may then be heated to effect the desired cure. Pressure may also be applied to assist in effecting the desired bond. Preferred cure temperatures range from about 100° C. to about 250° C., with preferred temperatures ranging from about 100° C. to 175° C. Preferred pressures vary from contact pressure up to about 2000 p.s.i.

When the compositions are used as adhesives for metal-to-metal bonding, it has been found advantageous in some cases to impregnate cotton, wool, synthetic fiber or glass cloth textiles with adhesive composition or solution thereof, and then use the impregnated textile as a bonding tape for joining the metals. Such tapes provide convenient means for handling and using the compositions in adhesive applications. The tape is inserted between the two metals desired to be joined, and the assembly is heated and baked to cure the resin whereby articles are obtained wherein the joined surfaces have not only excellent strength at ordinary temperatures, but also retain good strength when heated to elevated temperatures or when exposed to boiling water and engine coolants as indicated above.

Adhesives having particularly outstanding properties are obtained by incorporating various thermoplastic resins with the above-noted polyepoxide-amino-substituted aromatic sulfonic acid amide combinations. Examples of these resins include the nylons which are linear polyamides prepared from polycarboxylic acids and polyamines, polyvinyl acetals, polycarbonates, polymers of formaldehyde and the like. These materials are preferably employed in amounts varying from about 10 parts to 250 parts per 100 parts of the polyepoxide. These special adhesive compositions can be prepared as a paste or as a solvent solution as noted above. The compositions may also be used to impregnate tape. These adhesive compositions may be cured by the same procedures noted above for the other adhesives.

The new compositions may also be used in the preparation of laminates or resinous articles reinforced with fibrous textiles. Although it is generally preferred to utilize glass cloth for this purpose, any of the other suitable fibrous materials in sheet form may be employed such as glass matting, paper, asbestos, mica flakes, cotton bats, duck muslin, canvas and the like. It is useful to prepare the laminates from woven glass cloth that has been given prior treatment with well known finishing or sizing agents therefor, such as chrome methacrylate or vinyl trichlorosilane.

In preparing the laminate, the sheets of fibrous material are first impregnated with a mixture of the polyepoxide, amino-substituted aromatic sulfonic acid amide, and suitable solvent, such as acetone. This impregnation may be accomplished by spreading or dipping or otherwise immersing the sheets in this solution. The solvent is conveniently removed by evaporation and the mixture is cured to the fusible resin stage. Although this operation may be conducted at lower temperatures it is generally preferred to conduct it at temperatures of about 60° C. to 200° C. A plurality of the impregnated sheets are then superimposed and the assembly is cured in a heated pressure under a pressure of about 25 to 500 pounds per square inch. The resulting laminate is very strong and resistant to the action of water and organic and corrosive solvents.

The compositions of the invention are also useful in the preparation of protective coatings. In this application, they are preferably dissolved in a suitable solvent and this mixture applied to the desired surface. Suitable solvents are noted hereinabove. The amount of solvent contained in the solution may vary to suit the particular need. Ordinarily, the solution will contain about 5% to 60% of the composition of the invention. The solution is applied to the surface to be coated, and either the solvent is allowed to evaporate after which heat is applied by circulating hot air or by use of infrared lamps, or the heating is effected with simultaneous removal of the solvent and curing.

When used as film-forming agents, the compositions may have various other materials incorporated therewith besides solvents such as pigments and other resins. Thus, pigments like titanium oxide, antimony oxide, carbon black, chrome yellow, zinc oxide, para red, and the like, may be used. Best results in preparing the enamels are obtained by grinding the pigment with a portion of the solvent and polyepoxide and then adding the remainder of the solvent and polyepoxide after the grinding operation. The enamel is ready for application upon addition of the curing agent.

When using the above-noted curing agents to prepare molded articles, it is generally preferred to first prepare a molding powder by milling together a mixture of the polyepoxide, curing agent and customary fillers and mold release agents. Usually the milled mixture is set up so that the polyepoxide has set up to a fusible resin. The milled mixture is then ground and molded articles prepared therefrom with conversion of the polyepoxide to the infusible state with the use of molding machines such as those for compression molding or transfer molding. Temperatures generally employed in the cure vary from about 100° C. to 250° C.

To illustrate the manner in which the invention may be carried out, the following examples are given. It is to be understood, however, that the examples are for the purpose of illustration and the invention is not to be regarded as limited to any of the specific materials or conditions recited therein.

Polyepoxides referred to in the examples by letters are those described in U.S. 2,633,458.

Example I

This example illustrates the unexpected improvement as to loss of strength on contact with boiling water that is obtained by use of the new compositions of the invention.

A series of adhesive compositions were prepared by mixing the following components: 50 parts of crystalline diglycidyl ether of 2,2-bis(4-hydroxyphenyl)propane, 50 parts of diglycidyl ether of a dihydric phenol obtained by reacting acetophenone with acetone, 35 parts of asbestos, various amounts of dicyandiamide and sulfanilamide as shown in the following table. The resulting mixtures were used as an adhesive for bonding aluminum plates to aluminum plates. The bonded plates were pressed together at about 40 p.s.i. and cured at 400° F. for 40 minutes. The initial tensile strengths initially and the strengths after 8 weeks in boiling distilled water are shown in the table:

| Sulfanilamide, Parts per 100 of Resin | Dicyandiamide, Parts per 100 of Resin | 250° F. Tensile Strength Initial | 250° F. Tensile Strength, After 8 weeks in Boiling Water |
|---|---|---|---|
| 0 | 8 | 4,300 | 490 |
| 3 | 7 | 3,330 | 500 |
| 9 | 5 | 2,930 | 700 |
| 15 | 3 | 4,200 | 1,180 |
| 21 | 1 | 2,580 | 1,480 |

The above results clearly demonstrate the unexpected improvement in loss of strength on contact with boiling water that is obtained by use of the above-noted new curing agents.

Example II

This example also illustrates the unexpected improvement in loss of strength on contact with boiling water and with an engine coolant, such as aqueous solution of ethylene glycol, that is obtained by use of the new compositions of the invention.

A series of adhesive compositions were prepared by mixing the following components: 60 parts of the glycidyl ether of N,N-diglycidyl p-hydroxyaniline, 40 parts of glycidyl ether of a novolac resin prepared from phenol and formaldehyde and having a functionality of about 3.5, 30 parts of asbestos, 10 parts of strontium chromate pigment, and varying amounts of dicyandiamide and sulfanilamide as shown in the table. The resulting mixture were used as an adhesive for etched 2023–T3-aluminum metal plates. The bonded plates were pressed together at 40 p.s.i. and cured at 300° F. 10 minutes past the time when the flash of the bond became hard. The tensile strengths initially and after 8 weeks in boiling distilled water are shown in the table below:

| Ex. No. | Cure Time | Sulfanilamide, Parts per 100 of Resin | Dicyandiamide, Parts per 100 of Resin | 250° F. Tensile Strength, Initially | 250° F. Tensile Strength, After 8 Weeks in Boiling Water |
|---|---|---|---|---|---|
| 1 | 65 | 0 | 12 | 3,420 | 700 |
| 2 | 55 | 6 | 9 | 2,680 | 850 |
| 3 | 45 | 12 | 6 | 3,700 | 1,210 |
| 4 | 45 | 18 | 3 | 2,460 | 1,720 |
| 5 | 65 | 33 | 1 | 2,130 | 1,710 |

The bonds prepared as noted above were also tested for their loss in strength after being placed in boiling 38% aqueous ethylene glycol for 2 months. The results are shown below:

| Experiment No. | Initial Strength | After 2 months in Boiling Ethylene Glycol |
|---|---|---|
| 1 | 3,420 | 900 |
| 2 | 2,680 | 1,040 |
| 3 | 3,700 | 1,870 |
| 4 | 2,460 | 2,270 |
| 5 | 2,130 | 2,860 |

The above experiment was repeated with the exception that the bonds were cured at 400° F. instead of 300° F. The results are shown in the table below:

| Ex. No. | Cure Time | Sulfanilamide, Parts per 100 of Resin | Dicyandiamide, Parts per 100 of Resin | 250° F. Tensile Strength, Initially | 250° F. Tensile Strength, After 8 Weeks in Boiling Water |
|---|---|---|---|---|---|
| 1 | 20 | 0 | 12 | 3,110 | 760 |
| 2 | 25 | 6 | 9 | 2,990 | 850 |
| 3 | 25 | 12 | 6 | 3,630 | 1,560 |
| 4 | 25 | 18 | 3 | 3,330 | 1,940 |
| 5 | 35 | 22 | 1 | 3,060 | 2,160 |

The bonds were also tested for loss in strength after being placed in boiling aqueous ethylene glycol. The results are shown in the following table:

| Experiment No. | Initial Strength | After 2 Months in Boiling Aqueous Ethylene Glycol |
|---|---|---|
| 1 | 3,110 | 690 |
| 2 | 2,990 | 1,280 |
| 3 | 3,630 | 2,000 |
| 4 | 3,330 | 2,270 |
| 5 | 3,060 | 3,240 |

Example III 100 parts of polyether A noted above, 35 parts of asbestos, 23.2 parts of sulfanilamide and tri(dimethylaminomethyl)phenol were mixed together to form an adhesive composition. This adhesive composition was used to bond aluminum metal plates. The bonded plates were pressed together at 40 p.s.i. and cured at 300° F. for 3 hours. The bonds were tested for initial tensile strength and tensile strength after 2 weeks in boiling water. The results are shown in the following table:

| Shelf Life | Amount of Promotor | 180° F. Initial Tensile Strength p.s.i. | 180° F. Tensile Strength, After 2 Weeks in Boiling Water |
|---|---|---|---|
| +2 weeks | 0.2 | 3,490 | 2,180 |
| 100 hours | 0.5 | 4,055 | 3,070 |
| 50 to 100 hours | 1.0 | 2,715 | 3,015 |

Example IV 100 parts of polyether A was mixed with 35 parts of asbestos, 0.36 part of benzyldimethylamine and the amount of sulfanilamide as noted in the following table. This composition was used as an adhesive to bond etched aluminum metal plates. The plates were pressed at 40 p.s.i. and cured 2 hours at 400° F. The tensile strengths at various test temperatures are shown in the table:

| Test Temperature ° F | Tensile Shear | |
|---|---|---|
| | 46.5 Parts of Curing Agent | 23.2 Parts of Curing Agent |
| 75 | 2,220 | 2,510 |
| 180 | 1,940 | 3,130 |
| 250 | 1,490 | 2,980 |
| 300 | 490 | 1,960 |

This demonstrates that best results are obtained when the functionality of the sulfanilamide is considered as 4 and when the corresponding equivalent amounts of the sulfanilamide is combined with the polyepoxide.

Example V 100 parts of polyether A are combined with 23.2 parts of sulfanilamide, and 35 parts of asbestos without a promoter. This mixture is used as an adhesive for bonding etched aluminum metal plates. The bonded was pressed together at 40 p.s.i. and cured at 300° F. for several hours. The resulting bond demonstrated excellent resistance to boiling water and boiding aqueous ethylene glycol and the loss in strength was much less than occasioned by the use of dicyandiamide as curing agent.

Example VI

Example V is repeated with the exception that polyether A is replaced with epoxidized tetrahydrobenzyl tetrahydrobenzoate. Related results are obtained.

Example VII

Example V is repeated with the exception that polyether A is replaced with an equivalent amount of epoxidized polybutadiene. Related results are obtained.

Example VIII

Example V is repeated with the exception that polyether A is replaced with equivalent amounts of each of the following: polyether B, polyether C and polyether D. Related results are obtained.

Example IX

Example V is repeated with the exception that polyether A is replaced with equivalent amounts of glycidyl ether of N,N-diglycidyl p-hydroxyaniline. Related results are obtained.

Example X

Examples I, II and IV are repeated with the exception that the sulfanilamide is replaced by each of the following: 3,5-diaminobenzenesulfonamide, 3-chloro-5-aminonaphthalenesulfonamide, 2 - aminomethylbenzenesulfonamide, and 2-amino-3-methylbenzenesulfonamide. Related results are obtained in each case.

I claim as my invention:

1. A process for producing a resinified product having improved resistance to water which comprises mixing and reacting at a temperature between 50° C. and 280° C. a glycidyl polyether of a polyhydric compound of the group consisting of polyhydric alcohols and polyhydric phenols, which glycidyl ether has an epoxy equivalency of 1.1 and a molecular weight above about 200, with 12 parts to 33 parts of sulfanilamide in the presence of from 1 part to 6 parts of dicyandiamide, said parts being per 100 parts of the glycidyl polyether.

2. A process as in claim 1 wherein the glycidyl polyether is a glycidyl polyether of 2,2-bis(4-hydroxyphenyl) propane.

3. A composition which can be cured to form a product having good resistance to water comprising a mixture of 100 parts of a glycidyl polyether of a polyhydric compound of the group consisting of polyhydric alcohols and polyhydric phenols, 12 to 33 parts of sulfanilamide, and 1 to 6 parts of dicyandiamide.

4. A composition as claim 3 wherein the glycidyl polyether is a glycidyl polyether of 2,2-bis(4-hydroxyphenyl) propane.

References Cited by the Examiner

UNITED STATES PATENTS

| 2,637,715 | 5/1953 | Ott | 260—47 |
| 2,955,101 | 10/1960 | Bruin et al. | 260—47 |
| 2,994,685 | 8/1961 | Delmonte et al. | 260—47 |
| 3,028,342 | 4/1962 | Katz et al. | 260—47 |

FOREIGN PATENTS

| 1,076,366 | 2/1960 | Germany. |

OTHER REFERENCES

Lee et al.: "Epoxy Resins," McGraw-Hill Book Co., Inc., N.Y., 1957, page 95 relied on.

WILLIAM H. SHORT, *Primary Examiner.*

HAROLD N. BURSTEIN, *Examiner.*

T. D. KERWIN, A. L. LIBERMAN, *Assistant Examiners.*